United States Patent [19]

Ishikawa et al.

[11] Patent Number: 4,941,559
[45] Date of Patent: Jul. 17, 1990

[54] WET FRICTION MEMBER, AND WET FRICTIONAL ENGAGEMENT APPARATUS FOR A TRANSMISSION USING THE SAME

[76] Inventors: Keiichi Ishikawa; Tadashi Tsuchiyama, both of c/o Kabushiki Kaisha Honda Gijutsu Kenkyusho, No. 4-1, 1-chome, Chuo, Wako-shi, Saitama-ken; Yasuyuki Suzuki; Hiroaki Hasegawa, both of c/o Kabushiki Kaisha FCC Kenkyusho, of No. 7000-46, Tekunorando, Hosoe-cho, Inasa-gun, Shizuoka-ken, all of Japan

[21] Appl. No.: 363,731
[22] Filed: Jun. 9, 1989

[30] Foreign Application Priority Data

Jun. 13, 1988 [JP] Japan .................. 63-143485

[51] Int. Cl.$^5$ .................. F16D 13/6; F16D 13/74
[52] U.S. Cl. .................. 192/107 R; 192/107 M; 192/70.14
[58] Field of Search .............. 192/52, 107 M, 107 R, 192/109 F, 70.12, 70.14, 113 B

[56] References Cited

U.S. PATENT DOCUMENTS 2,516,544 7/1950 Breeze .................. 192/113 B
4,741,424 5/1988 Kitano et al. ............. 192/107 M Primary Examiner—Rodney H. Bonck
Assistant Examiner—Nicholas Whitelaw
Attorney, Agent, or Firm—Armstrong, Nikaido Marmelstein, Kubovcik & Murray

[57] ABSTRACT

A wet frictional engagement apparatus comprising an input side member, an output side member, a wet friction member attached to one of the input side member and the output side member, an opposite member facing the friction member and attached to the other of the input side member and the output side member, and a device for applying pressure to engage the friction member and the opposite member. The wet friction member comprises a substrate, a plurality of first friction submembers mounted spaced apart on the substrate, and a plurality of second friction submembers mounted on the substrate each adjacent one of the first friction submembers forming a pair of submembers. Each pair of submembers is spaced from each adjacent pair by an oil groove. Each first friction member is relatively less oil-permeable and each second friction member is relatively more oil-permeable. In this manner, wet friction member has a different effective coefficient of friction depending on which direction relative motion between the friction member and the opposite member occurs when pressure is applied therebetween.

4 Claims, 4 Drawing Sheets

FIG. 4(a)
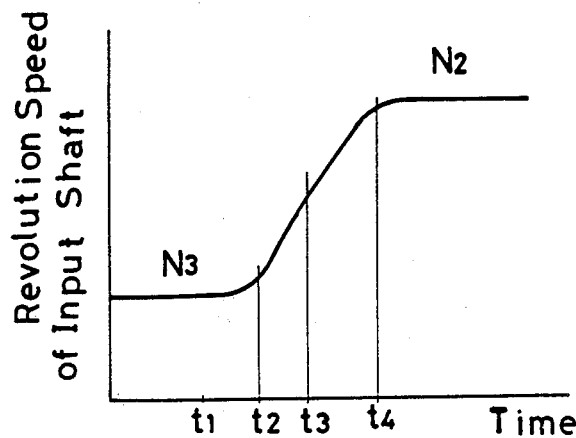
FIG. 4(c)
FIG. 4(b)
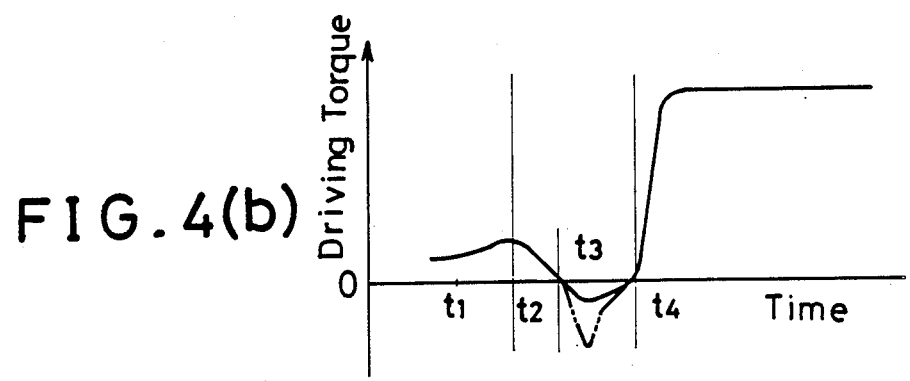
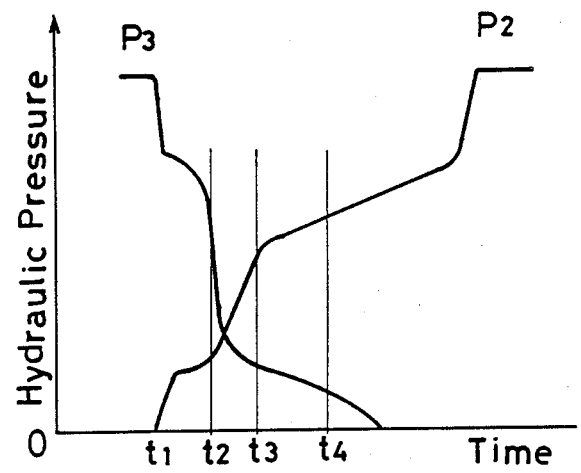

WET FRICTION MEMBER, AND WET FRICTIONAL ENGAGEMENT APPARATUS FOR A TRANSMISSION USING THE SAME

BACKGROUND OF THE INVENTION

This invention relates to a wet friction member having a friction characteristic that changes with the sliding direction, and to a wet frictional engagement apparatus such as a wet friction clutch for a transmission using such a wet friction member.

So far, no wet friction member has been known having a friction characteristic that changes with the sliding direction.

In a hydraulically operated transmission, when speed of a vehicle is changed, for example, from third speed to second speed by a downshift operation in which oil is discharged from the third-speed hydraulic clutch that establishes the third-speed gear train and at the same time oil is charged to the second-speed hydraulic clutch that establishes the second-speed gear train, the third-speed hydraulic clutch can be disengaged slightly earlier to put the transmission in neutral temporarily so as to cause the engine to react to slightly increasing its speed of revolution, so that the difference in number of revolutions between the input side and the output side of the second-speed hydraulic clutch is reduced for smooth engagement of the second-speed hydraulic clutch, thus minimizing gear shift shocks.

However, if the transmission remains in neutral for too long, the engine revolution speed increases to an excessively high level. To prevent this, charging and discharging of oil to and from the second-speed hydraulic clutch and third-speed hydraulic clutch is controlled so that the second-speed hydraulic clutch may become engaged slightly before the difference in number of revolutions between the input side and output side of the second-speed hydraulic clutch becomes zero. As a result, when engagement of the second-speed hydraulic clutch is being performed, the revolution speed of the input side of that clutch is forcibly increased from a lower level to that of the output side, so that all the load for increasing rotations of the all the rotating members ranging from the clutch to the engine should be taken on by the output side of the second-speed hydraulic clutch. This results in a temporary sharp drop in the driving torque and therefore an unsmooth shifting of gears.

A transmission has been known which has a one-way clutch built into its first-speed gear train to allow over-rotation of the output side of the first-speed gear train. In such a transmission when a downshift operation is performed to change speed from second speed to first speed, the disengagement of the second-speed clutch causes the engine to race to increase its speed of revolution When the revolutions of the input side of the one-way clutch is increased with such engine racing so much as to almost exceed that of the output side, the one way clutch becomes engaged to establish the first-speed gear train. Therefore, the output side of the transmission does not take on the load that causes the revolution speed of the input side to increase, thus providing a smooth gear shifting.

As mentioned above, with a gear train provided with a one-way clutch, lowering of the driving torque that can occur in the course of gear shifting is prevented to assure a smooth shifting of gear. However, the gear train provided with a one-way clutch cannot transmit a reverse driving torque from the drive wheel so that there arises a problem that engine braking does not work at all. Because of this problem, the one-way clutch cannot be incorporated in the second-speed and third-speed gear trains that are operated in the medium and high speed ranges.

In the above instance, it may be possible to provide, in parallel with a one-way clutch in the second-and third-speed gear trains, a hypothetical engagement device which is directly connectable to both the input and output sides of the clutch so that, when a throttle opening is reduced to its lowest degree in order to effect engine braking the hypothetical engagement device would be activated to directly couple the input side and the output side of the one-way clutch for transmitting the reverse driving torque from the output side to the input side. This, however, would result in many problems such as an increase in the size and weight of the transmission due to addition of the engagement device and a complicated structure of the hydraulic control device.

If a hydraulic clutch is equipped with a clutch plate such as a wet friction member whose friction characteristic changes with the sliding direction so that the clutch may come to more easily slip under a condition in which the output side member of the clutch is over-rotating relative to the input side member thereof, it is possible to minimize gear shift shocks even without use of a one-way clutch.

SUMMARY OF THE INVENTION

To achieve the above object, the present invention provides a wet friction member comprising: a substrate; first and second friction submembers disposed on the substrate with the first and second friction submembers adjacent to each other with respect to a sliding direction, the first friction submember being relatively harder to be impregnated (less-permeable) with a lubricating oil and said second friction submember being relatively easier to be impregnated (more-permeable) with a lubricating oil; and oil grooves, each of which is formed at a boundary portion between the first friction submember and the second friction submember, the first friction submember being in the rear and the second friction submember being in front with respect to one of regular and reverse sliding directions. In addition, a wet frictional engagement apparatus according to the present invention has the wet friction member as described above used as a friction member thereof and arranged such that the sliding direction it takes when overrotation of the output side member of the engagement apparatus occurs relative to the input side member thereof may coincide with said one of the sliding directions.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 4(a), 4(b) and 4(c) are diagrams showing respectively a revolution speed change characteristic of the input shaft during downshift from third speed to second speed, oil pressure change characteristics of the second-speed hydraulic clutch and the third-speed hydraulic clutch, and a change characteristic of the driving torque;

DETAILED DESCRIPTION OF A PREFERRED EMBODIMENT

Figure 1:
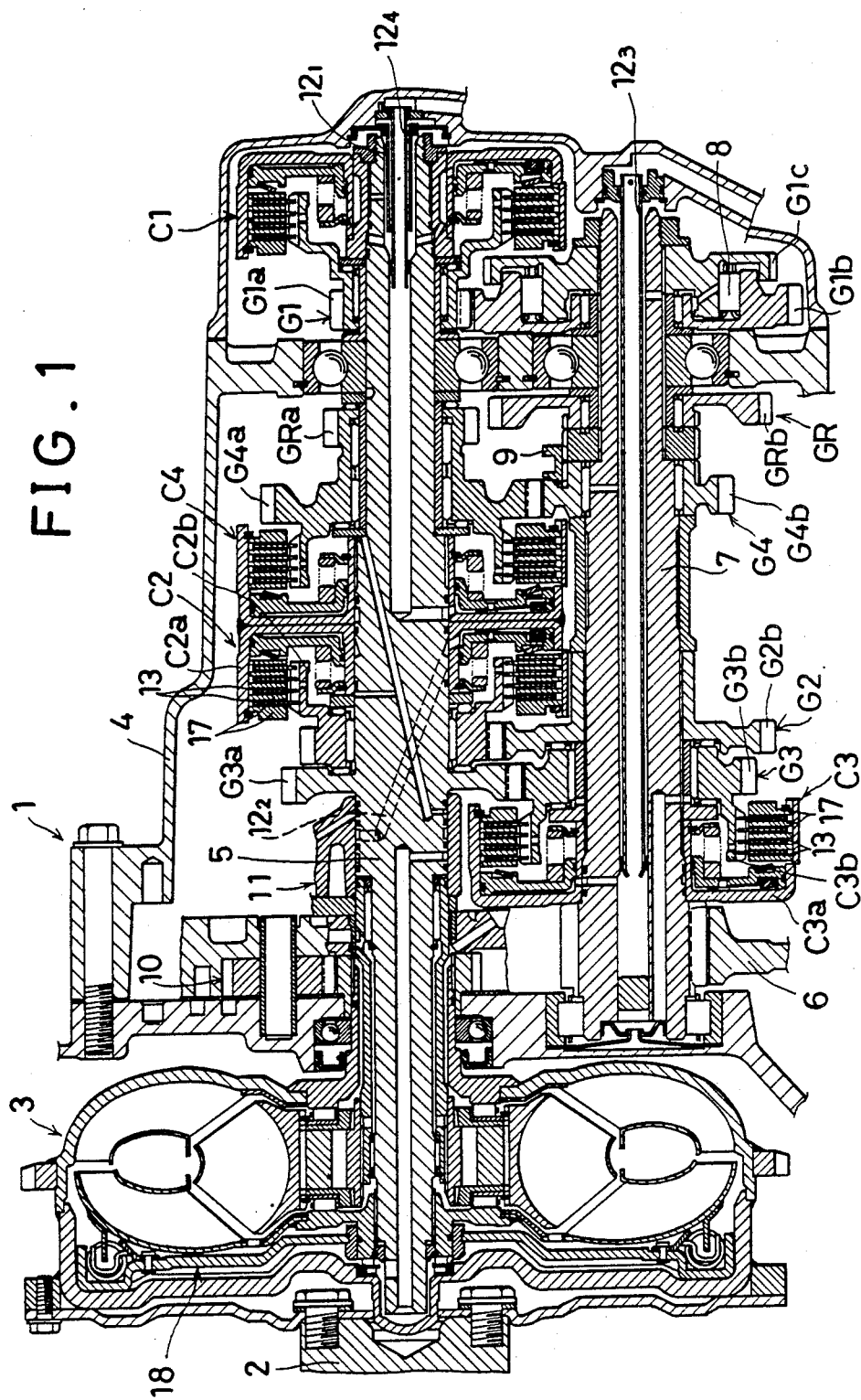
FIG. 1 is a longitudinal sectional view of a transmission according to one embodiment of the present invention in which hydraulic clutches thereof are each equipped with a wet friction member of this invention.

Referring to FIG. 1, a transmission 1 is connected through a torque converter 3 to a crank shaft 2 of the engine. The transmission 1 has a parallel two-shaft construction in which an input shaft 5 connected to the torque converter 3 and an output shaft 7 coupled to an output gear 6 linked with driving wheels of a vehicle are supported in parallel in a transmission case 4. Between the two shafts 5 and 7, forward gear trains G1, G2, G3, and G4 for first through fourth speed and a reverse gear train GR are installed in parallel. Each of the forward trains G1, G2, G3 and G4 have a corresponding hydraulic clutches C1, C2, C3, and C4, each of which is a wet frictional engagement apparatus, so as to form a hydraulic transmission comprising four forward speeds and one reverse speed.

To describe it in more detail, the first-speed gear train G1 includes a first-speed hydraulic clutch C1 on the input shaft 5, a drive gear G1a coupled to the clutch C1, a driven gear G1b meshed With the drive gear G1a, and a parking gear G1c secured to the output shaft 7. Between the driven gear G1b and the parking gear G1c is interposed a one-way clutch 8 which permits overrotation of the parking gear G1c on the output side. As explained above, the one-way clutch 8 works to permit smooth upshift from or downshift to the first-speed gear train.

The second-speed gear train G2 includes a second-speed hydraulic clutch C2, a drive gear G2a coupled to this clutch C2, and a driven gear G2b which is fixedly secured to the output shaft 7 and in mesh with the drive gear G2a. The third-speed gear train G3 includes a drive gear G3a formed integrally with the input shaft 5, a driven gear G3b which is in mesh with the drive gear G3a, and a third-speed hydraulic clutch C3 on the output shaft 7 coupled to the driven gear G3b. The fourth-speed gear train G4 includes a fourth-speed hydraulic clutch C4 on the input shaft 5, a drive gear G4a coupled to the clutch C4, and a driven gear G4b being in mesh with the drive gear G4a. Formed integrally with the drive gear G4a is a drive gear GRa of the reverse gear train GR. A driven gear GRb of the reverse gear train GR, which is in mesh with the drive gear GRa through an idler gear (not shown), and the driven gear G4b of the fourth-speed gear train G4 are selectively connected to the output shaft 7 by moving a selector gear 9 on the output shaft 7 to the reverse drive position on the right in the drawing or to the forward drive position on the left (as shown in FIG. 1). With the selector gear 9 switched over to the reverse drive position, hydraulic oil is supplied to the fourth-speed clutch C4 to establish the reverse gear train GR.

In the drawing, an oil pump 10 is provided in the transmission case 4 at the end on the engine side. A valve block 11 incorporates various valves including manual valves and shift valves. When the selector lever in the driver's compartment is manipulated to set the manual valve to the automatic drive position for forward travel of the vehicle, the pressure oil from the pump 10 is first supplied to the first-speed hydraulic clutch C1 through a pipe $12_1$ which is embedded in the end wall of the transmission case 4 and inserted into the input shaft 5, thus establishing the first-speed gear train G1. Then as the vehicle speed is increased to enter the second-speed range, the pressure oil is supplied to the second-speed hydraulic clutch C2 through an oil path $12_2$ formed in the input shaft 5, thereby establishing the second-speed gear train G2. As the vehicle speed is further increased to enter the third-speed range, the oil is discharged from the second-speed hydraulic clutch C2 and at the same time the third-speed hydraulic clutch C3 is supplied with the pressure oil through a pipe $12_3$ which is embedded in the end wall of the transmission case 4 and inserted into the output shaft 7, thus establishing the third-speed gear train G3. With the vehicle speed further increased to enter the fourth-speed range, the oil is discharged from the third-speed clutch C3 and at the same time supplied to the fourth-speed hydraulic clutch C4 through a pipe $12_4$ located inside the pipe $12_1$ which is embedded in the end wall of the transmission case 4 and inserted into the shaft 5. As a result, the fourth-speed gear train G4 is established. During the forward driving, the selector gear 9 is at the forward drive position and the first-speed hydraulic clutch C1 is kept charged with the pressure oil so that it remains engaged.

Figure 2:
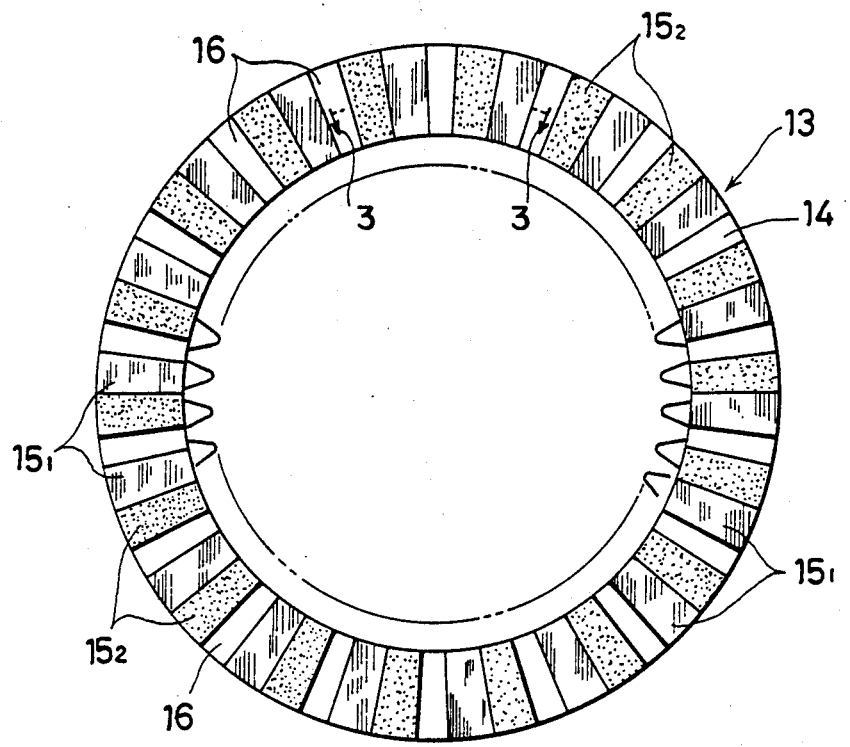
FIG. 2 is a front view of a clutch plate which is a friction member according to this invention.
Figure 3:
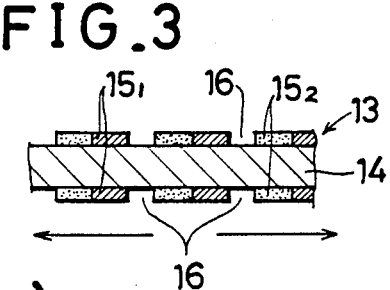
FIG. 3 is a sectional view taken along the line 3—3 in FIG. 2.

In this transmission, each of the second- and third-speed hydraulic clutches C2 and C3 has a clutch plate 13 as its friction member whose friction characteristic changes with the rotational direction of inner clutch members C2b, C3b with respect to outer clutch members C2a, C3a. As shown in FIGS. 2 and 3, the clutch plate 13 comprises a substrate 14 made of an annular plate having serrations 14a provided on the inner circumference thereof for engagement with the inner clutch member. The first friction submembers $15_1$ relatively harder to be impregnated with a lubricating oil and the second friction submembers $15_2$ relatively easier to be impregnated with a lubricating oil are disposed in the circumferential direction on both sides of the substrate so that, with respect to a space for forming an oil groove 16 between a first friction submember $15_1$ and a second friction submember $15_2$ at a predetermined pitch, the first friction submember $15_1$ is at the side toward the counterclockwise direction in FIG. 2 and the second friction submember $15_2$ is at the side toward the clockwise direction, having the oil groove 16 interposed therebetween. In this arrangement, a first friction submember $15_1$ and a second friction submember $15_2$ abutting to said first friction submember $15_1$, both of which are located between two neighboring oil grooves 16, 16 are bonded to each other.

In the above arrangement, the clockwise direction in FIG. 2 corresponds to the rotational direction of the clutch plate 13 with respect to a pressure plate 17 provided on the outer clutch member C2a when the inner clutch member C2b which is the output side member of the second-speed hydraulic clutch C2 overrotates with respect to the outer clutch member C2a which is the input side member of the clutch.

When the outer clutch member C3a which is the output side member of the third-speed hydraulic clutch C3 overrotates with respect to the inner clutch member  C3b which is the input side member of that clutch, the direction in which the clutch plate 13 rotates with respect to a pressure plate 17 provided on the outer clutch member C3a corresponds to the counterclockwise direction in FIG. 2. Therefore, the clutch plate 13 for the third-speed hydraulic clutch C3 is arranged in a manner contrary to the second-speed clutch C2 so that the first friction submember $15_1$ may be at the side toward the clockwise direction and the second friction submember $15_2$ at the side toward the counterclockwise direction, having the oil groove 16 interposed therebetween.

A high-density, low $\mu$ ($\mu$ stands for friction coefficient) paper-base friction material is used as the first friction submember $15_1$ having, for example, a percentage of voids of about 10 to 20% while the second friction submember $15_2$ is of a porous, high-$\mu$ paper-base friction material having a percentage of voids of about 40 to 60%.

A lockup clutch 14 is built into the torque converter 3.

The operation of the friction member itself according to the present invention will now be explained with reference to FIG. 5 and 6.

Figure 5A:
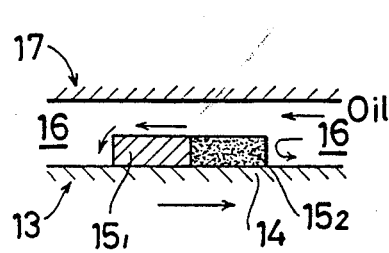
FIGS. 5(a) and 5(b) are explanatory diagrams illustrating the operating principle of the present invention.
Figure 6:
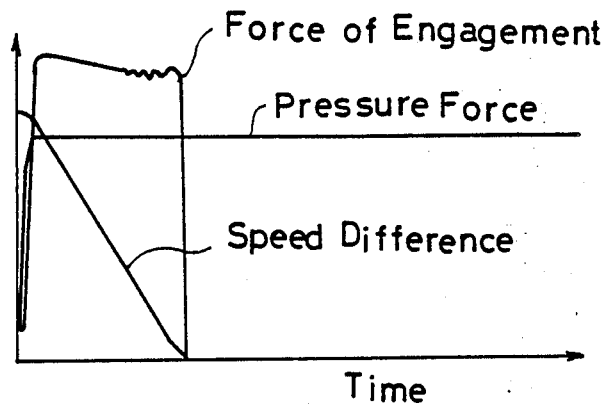
FIGS. 6(a) and 6(b) are diagrams showing a friction characteristic changing according to the sliding direction of the friction member.
Figure 6:
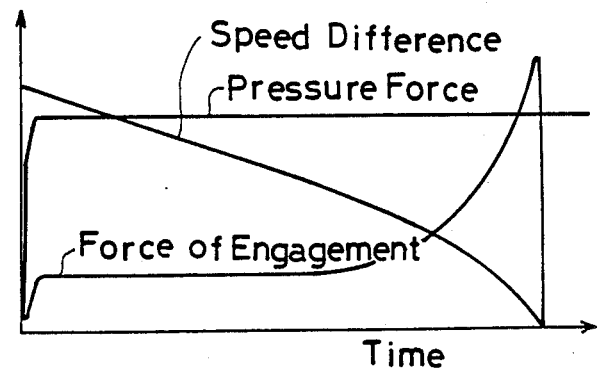

FIG. 5(a) shows a condition in which the friction member 13 is moving in a fast-engagement direction shown by an arrow with respect to the opposite member 17. The second friction submember $15_2$ which is relatively easier to be impregnated with lubricating oil leads. That is, the second friction submember $15_2$ is located right behind an oil groove 16 located forwardly in the sliding direction (to right-hand side in the drawing). A portion of the oil flowing rearwardly from the oil groove 16 when pressure is applied to the friction member 13 is forced out of the groove 16 and another portion thereof is consumed to impregnate the interior of the second friction submember $15_2$. The remainder of the oil flows onto the first friction submember $15_1$. This results in lesser supply of the oil to the first friction submember $15_1$, consequently causing the oil film on the first friction submember to be more easily broken, so that the resistance to the pressure applied between the friction member 13 and the opposite member 17 becomes lower to allow the friction submembers $15_1$ and $15_2$ to promptly come into frictional contact with the opposite member 17 and therefore give a large engagement force from the outset of pressure application as shown in FIG. 6(a).

Figure 5B:
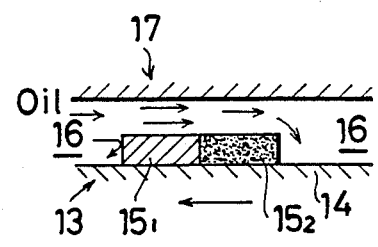

On the other hand, when the friction member 13 is moving in the delay-engagement sliding direction with respect to the opposite member 17 as shown by the arrow in FIG. 5(b), the first friction submember $15_1$ leads. That is, the first friction submember $15_1$ is located right behind the oil groove 16 located forwardly in the sliding direction (to the left-hand side in the drawing) so that the oil flows from the oil groove 16 directly to the first friction submember $15_1$. However, since the first friction submember $15_1$ is relatively harder to be impregnated with the oil, the oil can not permeate thereinto when pressure is applied between the friction member 13 and the opposite member 17, so that the oil film formed thereon remains more enduring to provide greater resistance to the applied pressure. Consequently, the force of engagement of the members 13 and 17 does not increase to a large value immediately from the outset of pressure application as shown in FIG. 6(b), but rather, only increases with a predetermined time lag required for the oil film to break down.

Thus, when a downshift operation is performed using  a wet frictional engagement apparatus for a transmission which has the wet friction member of this invention employed as a friction member, the apparatus is then in a position to slip more easily at the initial stage of its engagement with the result that the load borne by the output side for increasing revolution of the input side rotating member is alleviated and a smooth downshift operation can be carried out without a drastic decrease in the driving torque.

Now, the operation of the above embodiment of the wet frictional engagement apparatus for a transmission will be explained.

Referring to FIGS. 4(a), 4(b), 4(c), a case is first considered where at time t1, the third-speed hydraulic clutch C3 begins to be discharged of pressure oil and the second-speed hydraulic clutch C2 begins to be charged with pressure oil to perform a downshift from third speed to second speed. In this case, as shown in FIG. 4(b), the oil pressure P3 of the third-speed clutch C3 drops relatively quickly, so that the clutch C3 becomes virtually disengaged at time t2. However, the oil pressure P2 of the second-speed clutch C2 increases relatively slowly, so that the second-speed clutch C2 starts to engage at time t3, that is, after t2. The transmission is therefore in the neutral state causing the engine to race during the period between t2 and t3, so that the revolution speed of the input shaft 5 starts to increase as shown in FIG. 4(a). At the same time, because the power from the engine is not transmitted to the output shaft 7, the driving torque begins to fall toward zero, as shown in FIG. 4(c).

If N stands for the revolution speed of the output shaft 7 at time of downshift, N3 and N2 for the revolution speed of the input shaft before and after the downshift, and r3 and r2 (r3<r2) for reduction ratios of the third-speed and second-speed gear trains G3 and G2 respectively, then the following relation holds.

$$N = \frac{N3}{r3} = \frac{N2}{r2}$$

Thus, $$N2 = \frac{r2}{r3} N3$$

This means that until the revolution speed of the input shaft 5 increases to N2, the revolution speeds of the input side and the output side of the second-speed hydraulic clutch C2 do not coincide with each other.

At time t3, the revolution speed of the input shaft 5 has not yet increased to N2, so that the output shaft 7 will have to take on the burden or load of bringing up the revolution speed of the input shaft 5 to N2 through the second-speed clutch C2. This will cause the driving torque to decrease so much as to give a negative value. However, during this period, the inner clutch member C2b on the output side of the second-speed hydraulic clutch C2 is overrotating relative to the outer clutch member C2a on the input side of the clutch and the clutch plate 13 is sliding relative to the pressure plate 17 in the delayed-engagement direction as shown in FIG. 5(b), so that the oil from the oil groove 16 flows to the second friction submember $15_2$ after passing the first friction submember 15₁. Thus, as described above, the clutch is put in a position to more easily slip so as to alleviate the load taken on by the output shaft 7. This prevents the driving torque from falling sharply as shown in the solid line in FIG. 4(c) as compared with an instance when the driving torque drops sharply as indicated by an imaginary line on FIG. 4(c) if there is no such slipping or slow engagement of the clutch.

As the input shaft 5 increases its revolution speed, the driving torque also increases toward zero. At time t4 when the input shaft revolution speed has reached N2, the engagement force of the second-speed hydraulic clutch C2 rapidly increases and the driving torque rises to a value normally provided by the second-speed gear train G2.

When the gear is shifted up from second speed to third speed, the oil pressure in the second-speed hydraulic clutch C2 is lowered relatively slowly so that the second-speed clutch C2 may be disengaged only after the third-speed clutch C3 starts to engage. During this process, concurrent coupling or engagement of the two clutches occurs temporarily. However, since the third-speed hydraulic clutch C3 in this instance starts to engage from a state in which the inner clutch member C3b on the input side of the clutch is overrotating relative to the outer clutch member C3a on the output side thereof, that is, the state in which the clutch plate 13 is sliding relative to the pressure plate 17 in the fast-engagement direction as shown in FIG. 5(a), the engagement force rapidly increases with the rise of the oil pressure, as explained above.

As the third-speed hydraulic clutch C3 starts to engage, the revolution speed of the input shaft 5 decreases and the revolution speed of the outer clutch member C2a on the input side of the second-speed hydraulic clutch C2 becomes lower than that of the inner clutch member C2b on the output side of the clutch while the clutch plate 13 slides in the delayed-engagement direction indicated on FIG. 5(b) relative to the pressure plate 17, so that the oil is drawn from the oil groove 16 into a slidably abutting portion between the pressure plate 17 and the first friction submember 15₁ to promptly form an oil film there with the result that the engagement force of the second-speed hydraulic clutch C2 rapidly decreases to permit a smooth upshift free from the engine racing and with the concurrent coupling or engagement kept to a necessary minimum.

For an upshift or a downshift between third speed and fourth speed, the clutch plate 13 for the third-speed hydraulic clutch C3 functions the same way as described above with respect to the clutch plate 13 for the second-speed hydraulic clutch C2 so as to assure the same smooth gear change operation as in case of that between second speed and third speed.

Even if the accelerator pedal is returned to its free position to apply engine braking when the vehicle is running in second or third speed range, the second-speed hydraulic clutch C2 or the third-speed hydraulic clutch C3 still remains engaged at that time and the engagement force is therefore not lowered, so that working of the engine braking is not adversely affected by the slipping of the clutch.

In the foregoing, the present invention is explained with reference to an embodiment thereof in which the wet frictional engagement apparatus is used in a hydraulic clutch of a transmission. It should, however, be noted that the wet friction member according to this invention may be used in a frictional engagement apparatus for a brake or the like employed with planetary gear transmission.

As described above, the friction member according to the present invention can slip relatively more easily when it is sliding in one direction relative to an opposite member whereas it is less easy for the friction member to slip when sliding in the other direction. By adopting the friction member of the present invention as a friction member in a frictional engagement apparatus for a transmission, a high-performance transmission giving minimized gear shift shock can be obtained simply through minimum modification of an existing transmission and its control system, which constitutes the advantage brought about by the present invention.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A wet friction member comprising:
   a substrate;
   first and second friction submembers disposed on the substrate adjacent to each other with respect to a sliding direction, said first friction submember being relatively less oil-permeable with a lubricating oil and said second friction submember being relatively more oil-permeable with a lubricating oil; and
   oil grooves, each of which is formed at a boundary portion between a pair of said first friction submembers and second friction submembers said first friction submember of the pair being in the rear and said second friction submember of the pair being in front with respect to one of regular and reverse sliding directions.

2. A wet frictional engagement apparatus for a transmission wherein a wet friction member which comprises:
   a substrate,
   first and second friction submembers disposed on the substrate adjacent to each other with respect to a sliding direction, said first friction submember being relatively less oil-permeable with a lubricating oil and said second friction submember being relatively more oil-permeable wit a lubricating oil, and
   oil grooves, each of which is formed at a boundary portion between a pair of said first friction submembers and second friction submembers, said first friction submember of the pair being in the rear and said second friction submember of the pair being in front with respect to one of regular and reverse sliding directions,
   is used as a friction member thereof and arranged such that the sliding direction it takes when overrotation of the output side member thereof may coincide with one of the sliding directions.

3. A wet frictional engagement apparatus comprising:
   an input side member,
   an output side member,
   a wet friction member attached to one of said input side member and said output side member, an opposite member facing said friction member and attached to the other of said input side member and said output side member, and means for applying pressure to engage said friction member and said opposite member; said wet friction member comprising:

a substrate, a plurality of first friction submembers mounted spaced apart on said substrate, a plurality of second friction submembers mounted on said substrate, each adjacent one of said first friction submembers forming a pair of submembers, each pair of submembers being spaced from each adjacent pair by an oil groove, each said first friction member being relatively less oil-permeable and each second friction member being relatively more oil-permeable, whereby said wet friction member has a different effective coefficient of friction depending on which direction relative motion between said friction member and said opposite member occurs when pressure is applied by said means.

4. The apparatus according to claim 3, wherein said input side member is an input shaft of a transmission, said output side member is an output shaft of the transmission, and said wet friction member, said opposite member, and said means jointly form a specific gear train hydraulic clutch.

* * * * *

UNITED STATES PATENT AND TRADEMARK OFFICE
CERTIFICATE OF CORRECTION

PATENT NO. : 4,941,559
DATED      : July 17, 1990
INVENTOR(S): ISHIKAWA et al

It is certified that error appears in the above-identified patent and that said Letters Patent is hereby corrected as shown below:

On the cover page, after Item [76], add the following:

--[73] Assignees: Honda Giken Kogyo Kabushiki Kaisha, Tokyo; and Kabushiki Kaisha FCC, Hamamatsu both of Japan--.

Signed and Sealed this

Eleventh Day of February, 1992

*Attest:*

HARRY F. MANBECK, JR.

*Attesting Officer*      *Commissioner of Patents and Trademarks*